United States Patent [19]

Schwarz et al.

[11] Patent Number: 5,224,332
[45] Date of Patent: Jul. 6, 1993

[54] MODULATED GAS TURBINE COOLING AIR

[76] Inventors: Frederick M. Schwarz, 162 Butler Dr., Glastonbury, Conn. 06033; David J. Candelori, 109 Hubbard St., Glastonbury, Conn. 06033; Richard D. Brooke, 243-A New State Rd., Manchester, Conn. 06040

[21] Appl. No.: 870,069

[22] Filed: Apr. 17, 1992

Related U.S. Application Data

[62] Division of Ser. No. 634,905, Dec. 27, 1990.

[51] Int. Cl.⁵ ............................................. F02G 3/00
[52] U.S. Cl. ............................................. 60/39.02; 60/39.75
[58] Field of Search .............. 60/39.02, 39.29, 39.75; 415/115, 116, 117, 118

[56] References Cited

U.S. PATENT DOCUMENTS

| | | | |
|---|---|---|---|
| 2,896,906 | 7/1959 | Durkin | 253/39.1 |
| 2,971,997 | 2/1961 | Carrico | 415/118 |
| 4,213,738 | 7/1980 | Williams | 416/95 |
| 4,217,755 | 8/1980 | Williams | 60/39.75 |
| 4,332,133 | 6/1982 | Schwarz et al. | 415/115 |
| 4,416,111 | 11/1983 | Lenahan et al. | 60/39.29 |
| 4,487,016 | 12/1984 | Schwarz et al. | 60/39.75 |
| 4,815,272 | 3/1989 | Laurello | 60/39.75 |
| 4,869,640 | 9/1989 | Schwarz et al. | 415/115 |
| 4,893,983 | 1/1990 | McGreehan | 60/39.29 |
| 5,022,817 | 6/1991 | O'Halloran | 415/115 |

FOREIGN PATENT DOCUMENTS

1348127 3/1974 United Kingdom ............... 60/39.75

*Primary Examiner*—Richard A. Bertsch
*Assistant Examiner*—Michael I. Kocharov
*Attorney, Agent, or Firm*—Edward L. Kochey, Jr.

[57] ABSTRACT

Cooling air to the 1-2 turbine stage seal is supplied in parallel with air to the second vane from a plenum. A modulatable valve in the supply line to the plenum regulates air flow in response to a sensed temperature in the 1-2 seal area at high sensed speeds. Valve and thermocouples are checked for proper operation. Immediate alerts and maintenance messages are established along with fail safe operating conditions upon fault detection. Over cooling of the seal area during low power operation, in anticipation of a power increase, is used to improve low cycle fatigue life of the turbine disk and seal runner.

10 Claims, 5 Drawing Sheets

FIG.5

MODULATED GAS TURBINE COOLING AIR

This is a division of copending application Ser. No. 07/634,905 filed on Dec. 27, 1990.

TECHNICAL FIELD

The invention relates to high temperature gas turbines and in particular to cooling of the first to second stage turbine seal area.

BACKGROUND OF THE INVENTION

The turbines of gas turbine engines operate with gas temperatures on the order of 1650° C. Such elevated temperature limits the allowable stress of various turbine parts, and produces deterioration which reduces the time between maintenance and replacement. The area between the first and second turbine rotor stages experiences high temperatures and is vulnerable By recognizing the temperature limits of the rotating structure we are able to maintain that temperature. Hot gas tends to bypass the stationary vanes adjacent to the first and second rotor disks. Labyrinth seals are used to restrict this leakage. Cooling air is frequently injected into this area to further deter gas path flow from contacting highly stressed parts. U.S. Pat. No. 4,869,640 shows such apparatus and further includes a restricted flow area between the main gas flowpath and the inlet ahead of the labyrinth seal.

Also requiring cooling airflow are the second stage vanes and the second stage turbine outer air seals around the periphery of the turbine. The cooling air is obtained from a compressor stage of high enough pressure to produce the necessary flow. Selection of a higher than necessary stage increases parasitic power loss because of the increased compression. It further supplies hotter air because of this compression.

The maximum need for cooling air is at maximum power which is equivalent to the maximum rotor speed. With the percentage airflow established for this condition, excess air flows at lower operating speeds and temperatures including cruise condition. All of the bypassing cooling air leads to reduced engine and turbine component efficiency. Excess cooling air beyond that required is therefore not desirable since it increases the thrust specific fuel consumption.

It is generally not sufficient to supply only an amount of cooling air to protect the 1-2 seal area with new seals. Additional air must be supplied to handle a worn seal condition. While this flow is only required at high power when the seals are worn, once the design is established this air flow exists at all times.

Of the three cooling air flows discussed above the cooling air to the labyrinth seal area is exposed to the highest gas pressure. Therefore, the differential pressure between the supply chamber and the injection point is less here than it is for the other cooling air flow. Accordingly, introduction of the cooling air into the labyrinth seal area is sensitive to achieve the efficacy of operation.

In the seal area between the first and second rotor stages a seal runner is secured to the turbine disks. This seal runner tends to operate hotter than the disks and therefore places a stress on the disk because of the differential expansion. In the transient from idle to takeoff power the runner heats faster than the disk and therefore the stress level peaks. This leads to low cycle fatigue damage.

SUMMARY OF THE INVENTION

It is an object of the invention to provide adequate cooling to the area between the first and second rotor stages as required while promoting engine efficiency when full cooling is not required.

It is a further object to maintain safe operating conditions in the event of failure of the temperature control.

It is a further object to decrease the off peak load cooling air flow to the second vane and to the second stage turbine air seals.

It is a further object to maintain low cycle fatigue life of the turbine disks and seal runner.

Cooling air for the area between the first and second turbine stage is taken from a plenum supplied from a compressor stage. A plurality of conduits deliver air to this plenum with a fixed resistance in one of the conduits and a variable operating valve in the other conduits.

The temperature at the 1-2 seal area is measured and the cooling air modulated in response to this measurement. This also reduces the cooling air to the second stage vane and to the second stage turbine air seal, where these receive air from the same plenum.

Dual thermocouples are used and valve position is checked. At appropriate times temperature is compared to an acceptable range. Warnings are established, maintenance messages are recorded, and a fail safe condition is established. Operating conditions are established in response to various failure modes.

At low mach air speed, generally corresponding to low engine speed, excess cooling air is supplied to overcool the interstage seal runner. During a subsequent power excursion, such as takeoff or thrust reversing on landing, the excess temperature of the seal runner is reduced, thereby maintaining low cycle fatigue life.

DESCRIPTION OF THE PREFERRED EMBODIMENT

Figures 1, 2:
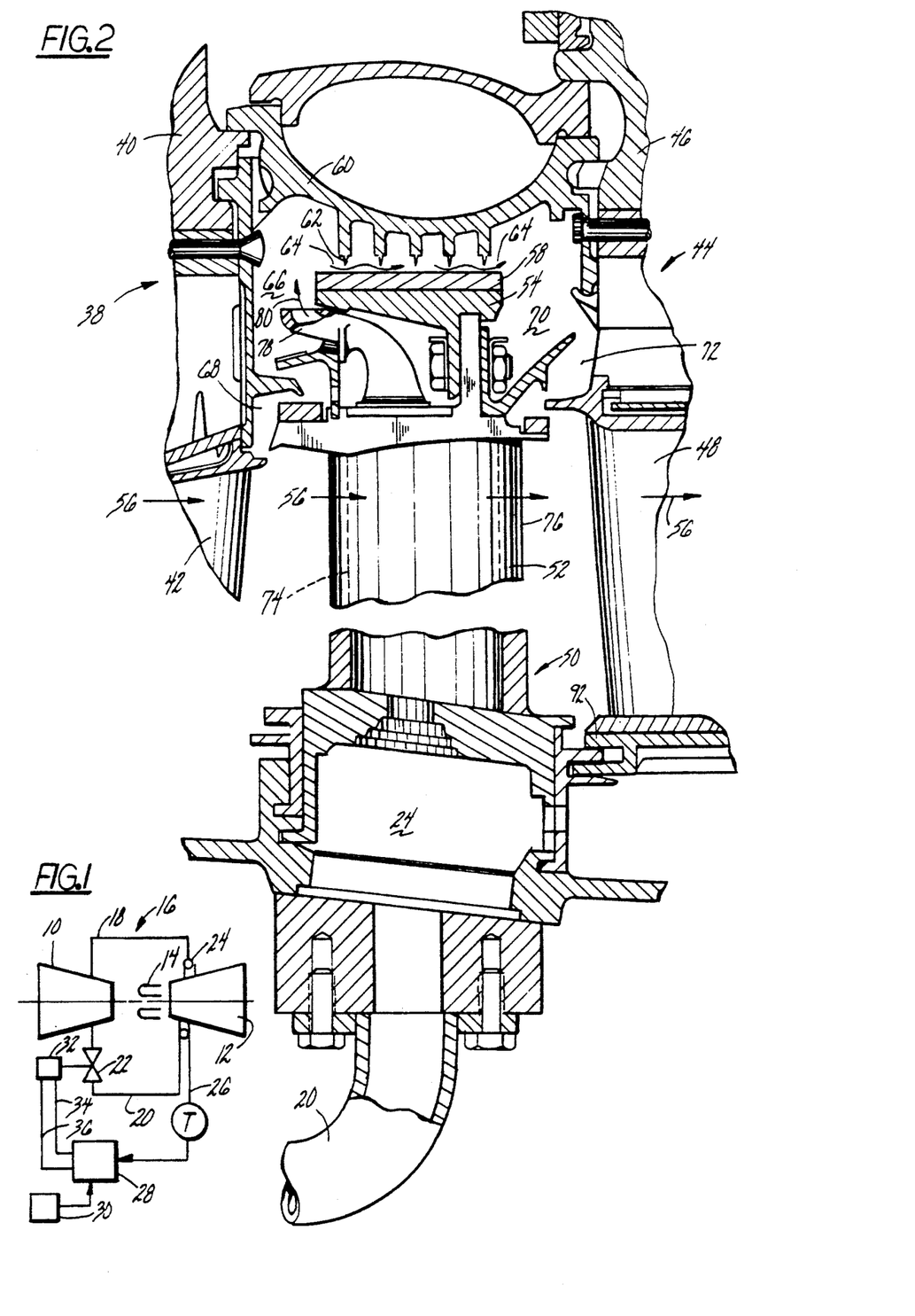
FIG. 1 is a schematic view of a compressor and turbine.
FIG. 2 is a section through the 1-2 turbine stage area showing cooling air injection.

FIG. 1 is a schematic of a gas turbine engine showing compressor 10 and gas turbine 12. The air passes through the combustors 14 producing the hot gas for entrance to the turbine.

The conduit network 16 includes an orificed conduit 18 and a plurality of conduits 20 each containing a modulatable control valve 22. This conduit network is connected to a compressor stage delivering air to plenum 24. Thermocouple assembly 26 measures a temperature described hereinafter and sends a temperature measurement signal to the engine controller 28. This controller includes the logic described hereinafter, and also includes the conventional information such as engine speed, ambient temperature, etc. Air speed sensor 30 also sends a control signal to the engine controller.

Control valve actuator 32 receives a control signal through line 34 and returns a position signal through line 36.

Referring to FIG. 2, a first rotor stage 38 includes a rotor disk 40 and a plurality of turbine blades 42. The second bladed rotor stage 44 includes a disk 46 and a plurality of blades 48. A vaned stator assembly 50 includes a plurality of hollow vanes 52 and a surrounding seal shroud 54.

An annular flow of hot working fluid 56 passes sequentially through blades 42, vanes 52 and blades 48.

Seal shroud 54 includes around its outer periphery an abradable honeycomb material 58. Seal runner 60 is sealingly connected to rotor stage 38 and rotor stage 44. This runner includes a plurality of knife edges 62 closely spaced from the seal shroud 54. This flow resistant labyrinth seal formed of knife edges 62 and shroud 54 forms a labyrinth flow passage 64. An upstream plenum 66 is in restricted fluid communication with the annular flow 56 through the convoluted passageway 68. Downstream plenum 70 is in restricted fluid communication with annular flow 56 through a restricted passageway 72.

Within hollow vanes 52 there is a perforated plate 74 closely spaced from the interior wall of the vane. Cooling air from plenum 24 passes through this perforated plate impinging on the inner surface of the vane. The cooling air exits through opening 76 at the downstream edge of the vanes. This is a conventional approach to cooling the vanes.

A further portion of the airflow from plenum 24 passes through the vane and through inlets 78 producing injection cooling airflow 80 into plenum 66 The purpose of this injected coolant 80 is to deter ingestion of hot gas through the passage 68 and to mix with this gas providing a lower temperature mixture. The maximum temperature desired in downstream plenum 70 is 650° C. At 11 000 turbine RPM the gas temperature entering the vanes is 1230° C. With an airflow 80 of 0.3 percent of the total engine airflow, the temperature in plenum 66 is 560° C. Work energy put into the airflow as it passes through the labyrinth seal causes increased heating with the temperature of approximately 650° C. in downstream plenum 70. With further heating as it exits through the restricted passage 72 it returns to the gas flow path at a temperature of 665° C.

Figures 3, 4:
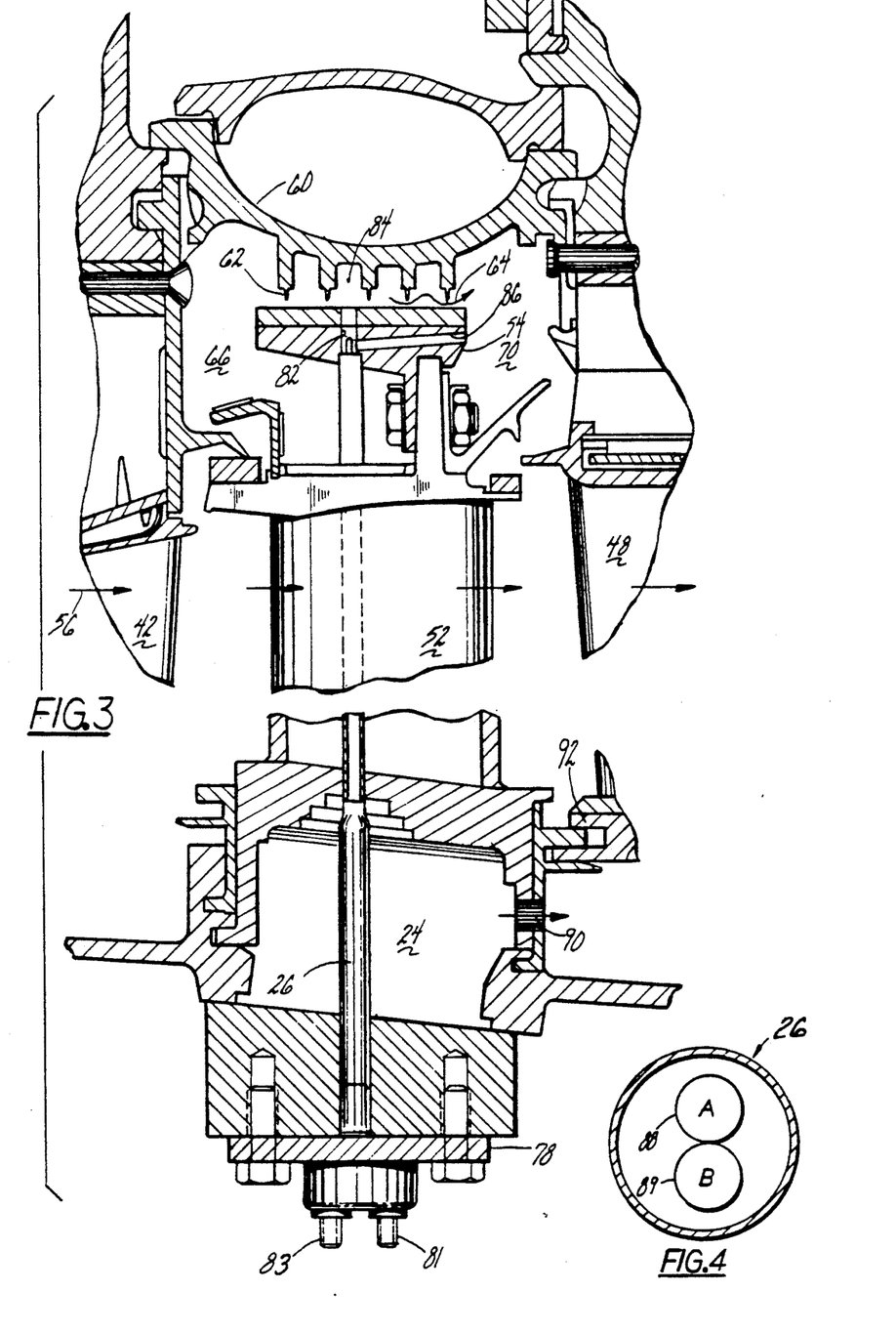
FIG. 3 is a section through the 1-2 stage area showing the thermocouple installation.
FIG. 4 is a section through the thermocouple installation showing the dual thermocouples.

In the described embodiment, injection passage 78 is located only on alternate vanes. All vanes include the vane cooling with perforated plate 74. FIG. 3 illustrates the installation of thermocouple assembly 26 through a vane which is not carrying the airflow to plenum 66. Cap 79 supports the thermocouple assembly and has two thermocouple outputs 83 and 81. The thermocouple assembly is straight and is therefore easily assembled and may be readily maintained in place. It passes into an opening 82 in shroud 54 for the purpose of sensing the gas temperature at the intermediate point 84 of the labyrinth flow passageway 64. The temperature at this location of 592° C. corresponds to the temperature of 650° C. in plenum 70. A bypass opening 86 through seal shroud 54 is in fluid communication with location 84 and also with the downstream plenum 70. A portion of the gas passes through this bypass opening since it is in parallel flow relationship with the remaining portion of the labyrinth flow passage. The thermocouple assembly 26 includes two thermocouples 88 and 89 (A and B) located within the flow passage. This provides a local high velocity at the thermocouple tips and permits the thermocouples to be located away from interference with the labyrinth seal interface.

A third cooling flowpath from plenum 24 passes as flow 90 through the plenum wall and cools the second stage turbine outer air seals 92. This flow thereafter passes into the main gas stream.

In response to the temperature sensed by thermocouple assembly 26 control system 28 sends a signal to actuator 32 of the modulatable valve 22 to vary the cooling airflow. The set point temperature for the temperature at 84 is substantially constant, being selected to keep the temperature in plenum 70 at an acceptable constant value. A higher temperature in plenum 70 would degrade the material beyond the amount designed to be acceptable. Too low a temperature, on the other hand, represents excess parasitic cooling airflow. The valves therefore are modulated to maintain this desired temperature.

During modulation the valves are open at intermediate and at high engine ratings, since at lower engine ratings the target temperature is not reached even with the valves fully closed. The unvalved conduit with a flow restriction provides some flow at all times even with the valves closed. This satisfies the need for some cooling flow in the three flowpaths.

It can be appreciated therefore that even with the valves modulating in a attempt to hold the temperature, there is a portion of the operating range where these valves will be fully closed in such an attempt. At such time the temperature is acceptable and the parasitic airflow is decreased.

Figure 5:
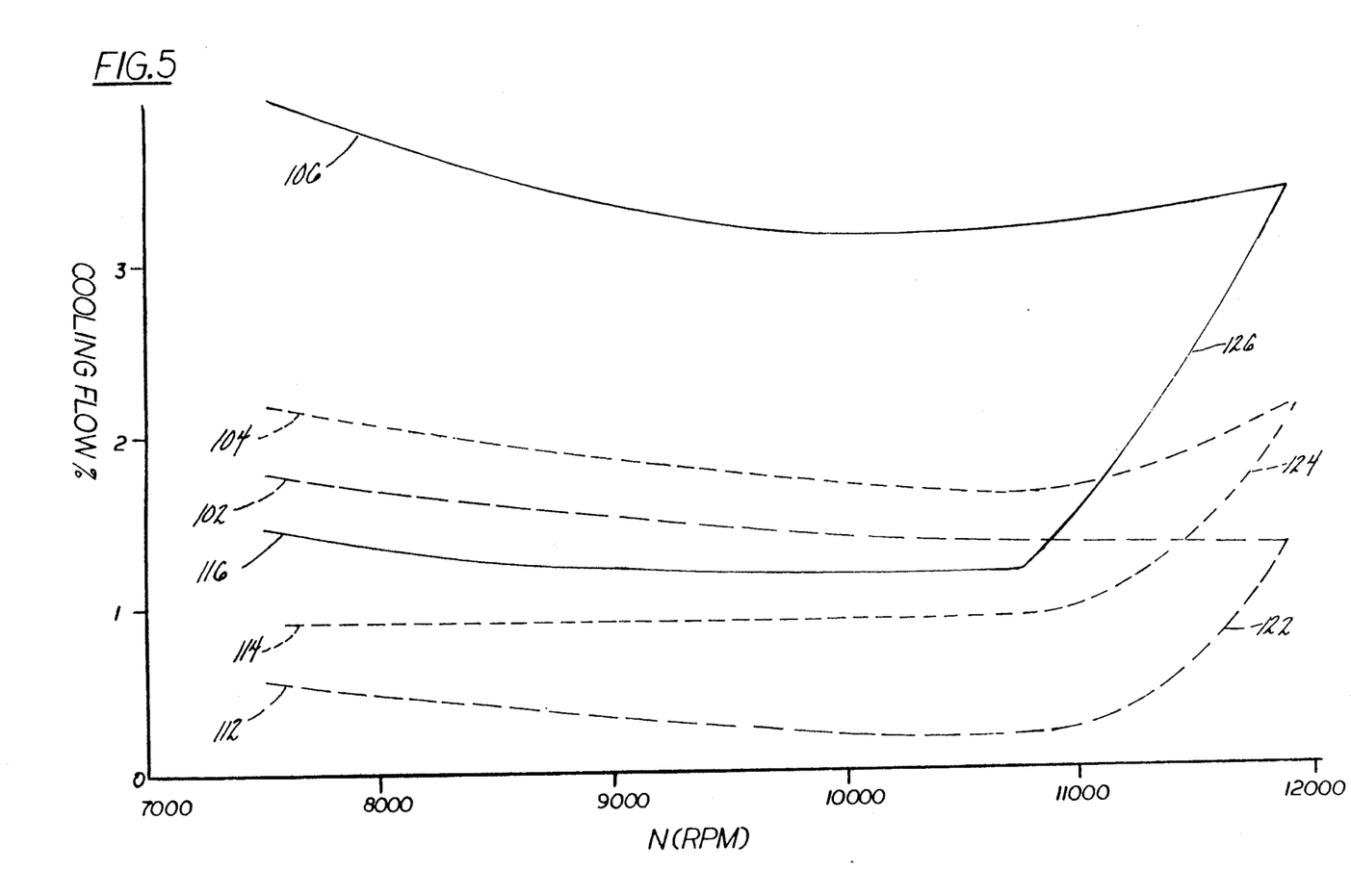
FIG. 5 is a curve showing the percent cooling air at various engine speeds.

FIG. 5 illustrates the percentage cooling air used at various engine speeds. Curve 102 illustrates the airflow injected into plenum 66 with the valves full open. Curve 104 illustrates the airflow to the second vane plus the second stage air seal with the valves fully open while curve 106 illustrates the total airflow to both of these.

With the valves fully closed, the corresponding flows are shown by curve 112 for the air to plenum 66 and curve 114 for the other airflow resulting in the total valve closed airflow of curve 116. At an engine speed of approximately 10,750 RPM the preselected temperature limit is reached and the valves begin modulation. This results in the increased airflow with increasing RPM shown by curve segments 122, 124 and 126, respectively. At the cruise rating of about 10,600 RPM this results in a total parasitic airflow reduction from 3.2 percent to 1.2 percent. Accordingly, engine efficiency is increased at this long term operating condition.

It is furthermore noted that since the valves are deeply modulated for the long term flight conditions and opened only insofar as they are needed at higher conditions, oversizing of the conduit network is not detrimental to the engine operation. It follows that with no penalty, the increased size may be used to provide sufficient cooling air even in the event of a severely deteriorated labyrinth seal.

Sizing of the cooling flow lines is done in the design stage, and must therefore be sufficient for a worst case leakage production engine. In the absence of this modulate to temperature invention, all production engines would suffer the performance penalty, even though the particular engine did not have high leakage.

Table 1 is a calculation where the total airflow is 3.60 percent with values full open and 1.90 percent with the values modulated.

TABLE 1

| | % Cooling Flow | | |
|---|---|---|---|
| | OPEN | MODULATED | % OF OPEN FLOW |
| Labyrinth Seal Area | 1.47 | 0.22 | 14.9 |
| 2nd Vane | 1.09 | 0.80 | 73.4 |
| 2nd Outer Air Seal | 1.04 | 0.78 | 75.0 |
| Total | 3.60 | 1.90 | 52.8 |

While the overall flow modulated is 52.8 percent of the full open flow, the 1-2 stage injection is only 14.9 percent of the full open flow. The sensitivity of this injection flow compared to the second vane flow and the second outer seal flow can be seen.

Low cycle fatigue damage to the turbine rotor disks can also be maintained by this system. Referring to FIG. 2 is it noted that the seal runner 60 is secured to disks 40 and 46. The seal runner 60 normally operates at a temperature higher than that of the disks and accordingly this circumferential seal places the loading on the disks. During idle conditions both are at relatively low temperature, but on takeoff the sudden increase of power causes the air and gas temperatures to rapidly increase. In this case the seal runner 60 increases its temperature at a more rapid rate than the disks 40 and 46. The temperature difference during this transient is greater than the temperature difference either before the transient before idle or after the transient for steady state operation at high power. This causes an exceptionally high stress during the transient leading to low cycle fatigue stress damage of the rotor.

Accordingly, when operating at low power conditions and expecting a power increase, valves 22 may be opened even through there is no disk cooling need for plenums 66 and 70. This reduces the temperature of the seal runner from 300° C. to 210° C. When takeoff power is applied, the seal runner starting at a lower temperature does not run as far ahead of the turbine disks as it would otherwise. The particular desire for such operation is at idle on the ground in preparation for takeoff, and during landing in preparation for thrust reversal operation. In either case the low power operation is a situation where engine efficiency and thrust are not required, and accordingly there is no significant penalty for use of the excess cooling air.

While various parameters could be used to detect the low power mode in anticipation of a power increase, the measurement of airspeed has been selected as best meeting the low cycle fatigue concern. During takeoff the cooling air is maintained independent of the turbine speed. Reverse thrust on landing is anticipated. Any other very low engine speed flight will usually be followed by a power excursion.

Figure 6:
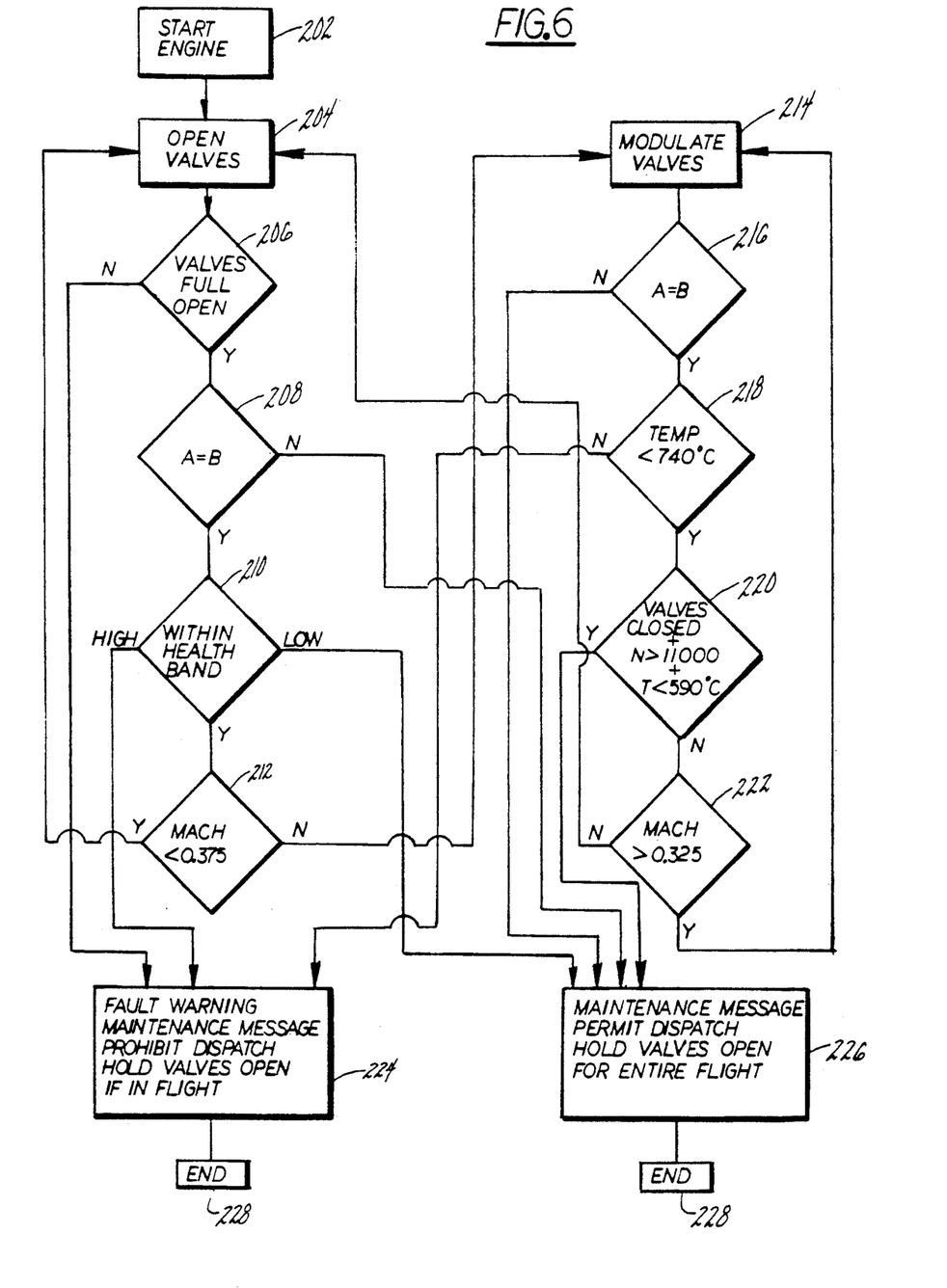
FIG. 6 is a logic diagram showing the handling of faults.

Referring to the logic diagram of FIG. 6 following start engine command 202 there is an open valve command 204. In logic box 206 valve positions are checked to see if the valves are fully open. If they are, the logic passes to logic box 208 which checks to see if thermocouple A equals thermocouple B. If the temperatures match within 22°, they are considered to be equal and the average of the two is used.

The logic passes to logic box 210 where the temperature (the average of the two) is checked to see if the measurement is within the health band. This band is substantially a predicted temperature range for the low power condition as a function of the ambient temperature along with a tolerance, and is described later with respect to FIG. 7. If the temperature is within the limits, the logic passes to logic box 212 for a check of aircraft speed. If the speed is below mach 0.375 the logic returns to the open valve box 204 and the series of logical comparisons are repeated.

Upon exceeding mach 0.375 the logic passes to instruction box 214 which starts the temperature control and modulates the valves. During this operation logic box 216 continues to check that both thermocouples are working and logic box 218 check to measure temperature against an extreme overtemperature condition.

Where the overtemperature is not found, logic passes to box 220 where a check is made to see if the valves are closed plus engine speed is greater than 1,000 RPM plus also the temperature is less than 590° C. Such a combination would suggest a thermocouple error. In the absence of that problem, logic passes to box 222 to see whether aircraft speed has dropped below mach 0.325. In the absence of such an airspeed decrease, operation continues in the modulated valve loop.

The pattern of operation in the event of an unsuccessful check in the logic falls into two groups. In instruction box 224 a fault warning is signaled to the pilot indicating the nature of the deficiency. A maintenance message is also sent to the aircraft computer for later review on the ground. If the aircraft has not been dispatched, dispatch is prohibited and if in flight the valves are either held open or continued attempts are made to open them.

Logic box 226 indicates the instructions on a less serious fault. There is no immediate warning, but a maintenance message is stored in the aircraft computer. Dispatch of the aircraft is permitted, but the valves are held open for the entire flight. Therefore no modulation is permitted and the performance benefit is lost while the fault exists.

Going back to the beginning of the logic loop, in logic box 206 if the valves are not full open, instruction box 224 is followed.

In logic box 208 if the thermocouples do not match, instruction box 226 is used.

The health band check in box 210 has two results depending upon whether the temperature is high or low compared to the band. If high, instruction box 224 is used, while if low, instruction box 226 is used.

During the modulated valves mode, a mismatch of temperatures in logic box 216 results in instruction box 226 action. A high temperature in logic box 218 directs the instructions in box 224. The potential thermocouple error identified in logic box 220 causes the action of instruction box 226 to take place.

In either case, instruction box 224 and 226 are both followed by an end of logic operations 228 since the valves will be held open and no further modulation will be considered.

Figure 7:
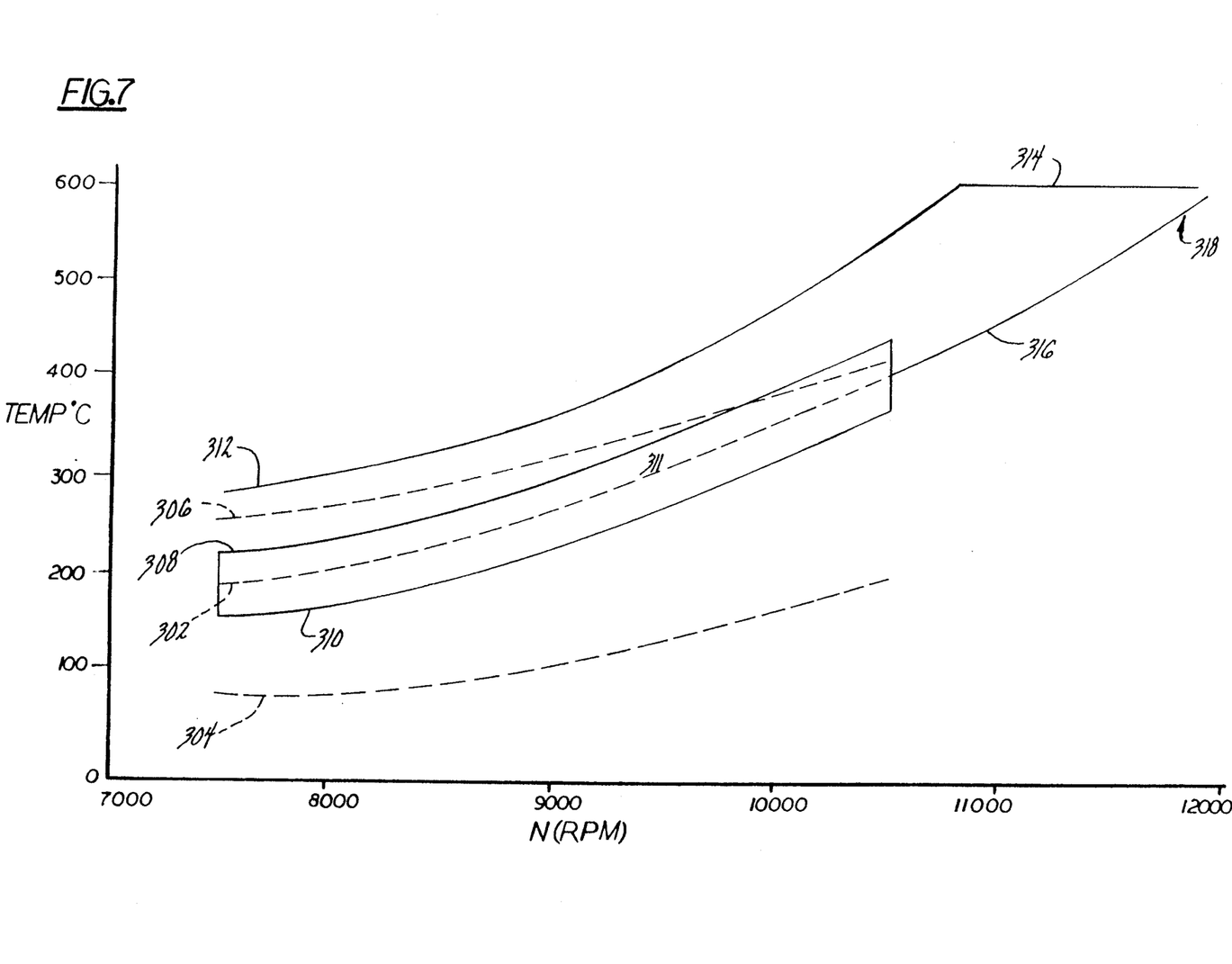
FIG. 7 is a curve showing the acceptable low power temperature window for the health check.

FIG. 7 shows the temperatures in the 1-2 turbine seal stage as a function of the engine speed. Curve 302 shows the expected nominal temperature on a 20° C. day. Curve 304 represents the expected temperature on a −50° C. day while curve 306 represents this temperature on a 55° C. day. Illustrated with respect to the 20° C. day is a high target limit 308 which is 35° above the nominal temperature and low target limit 310 which is 35° C. below the nominal temperature. These curves 308 and 310 establishing the high target and low target define the health check area 311 used during low speed operation to confirm that the thermocouples are properly operating. It is noted that this is established with the valves full open and that the box moves depending upon the ambient temperature. The target area 311 stops at 10,500 RPM. Above this engine speed the logic assumes any temperature to be within the health check box, since a check has already been made at lower turbine speed.

Also shown is curve 312 which (on the left side) represents the temperature at the 1-2 stage with the valves fully closed. A constant temperature portion 314 of the curve represents modulated valves holding a temperature of 602° C. Curve extension 316 represents on a 20° C. day, the temperature with valves full open. The difference between the temperatures of curve 314 and that of 316 is accomplished by the modulating of the valves. It is noted that as illustrated even at the maximum design speed 318 of 11,800 RPM the valves are not yet fully open. This provides tolerance for operation on a hotter day as well as tolerance for increased flow should it be needed for seal wear.

We claim:

1. In an axial flow gas turbine engine in an aircraft, said engine having an annular flow of hot working fluid passing sequentially through a first bladed rotor stage, a vaned stator assembly having a plurality of hollow vanes, and a second bladed rotor stage;
   a flow resistant labyrinth seal comprised of an annular seal runner sealingly secured to said first and second rotor stages and a seal shroud surrounding and secured to said vaned stator assembly in closely spaced relationship to said seal runner, forming a labyrinth flow passage therebetween;
   an upstream plenum in restricted fluid communication with said annular flow upstream of said vaned stator assembly and with said labyrinth flow passage;
   a downstream plenum in fluid communication with said labyrinth flow passage and in restricted flow communication with said annular flow downstream of said vaned stator assembly;
   a compressor;
   a conduit network connected to deliver a cooling airflow from said compressor to said upstream plenum, and a modulatable control valve means located in said conduit network, the method of operation comprising:
   measuring the temperature of gas passing through said labyrinth flow passage;
   sensing aircraft speed and comparing said sensed speed to a preselected air craft speed range;
   holding said valves open any item said sensed aircraft speed is less than said preselected aircraft speed range; and
   modulating he quantity of said cooling airflow in response to the measurement of the temperature of said gas passing through said labyrinth flow passage to keep the temperature at a substantially constant maximum value when said sensed aircraft speed is greater than said aircraft speed range.

2. The method of claim 1 including:
   after modulating said airflow when said sensed airflow is greater than said preselected aircraft speed range, opening said valves and holding said valves open when said sensed airspeed is less than said preselected aircraft speed range.

3. The method of claim 1 including:
   said preslected aircraft speed range comprising a first preselected aircraft speed and a second preslected aircraft speed less than said first preselected aircraft speed;
   initially comparing said sensed speed to said first preselected aircraft speed;
   holding said valves open when said sensed speed is less than said first preslected speed;
   modulation the quantity of said cooling airflow in response to the measurement of the temperature of said gas passing through said labyrinth flow passage to keep the temperature at a substantially constant maximum value, when said sensed airspeed is greater than said first preselected airspeed;
   thereafter comparing said sensed speed to aid second preselected air craft speed; and
   after modulating said aircraft speed when said sensed airflow is greater than said first preselected aircraft speed, opening and holding said valves open when said sensed airspeed is less than said second preslected aircraft speed.

4. The method of claim 3 including at low aircraft speed:
   confirming a valve open condition;
   comparing the sensed temperature to an expected temperature range based on engine speed and ambient temperature;
   sensing a fault message if said sensed temperature is higher than said temperature range.

5. The method of claim 4 including:
   holding said valves open for the remainder of any flight if said sensed temperature is lower than said temperature range, and recording a message for later maintenance review.

6. The method of claim 1, further comprising:
   sensing a valves open or closed condition;
   sensing engine speed;
   opening said valves and holding open said valves for the entire flight if said valves are closed, and said engine speed is above a preselected engine speed, and said sensed temperature is above a preselected temperature.

7. The method of claim 1 including:
   measuring the temperature of gas passing through said labyrinth flow passage with two thermocouples;
   comparing the measured temperature of each of said thermocouples; and
   opening and holding open said modulated valves in response to said measured temperatures differing by more than a preselected amount.

8. In an axial flow gas turbine engine in an aircraft, said engine having an annular flow of hot working fluid passing sequentially through a first bladed rotor stage, a vaned stator assembly having a plurality of hollow vanes, and a second bladed rotor stage;
   a flow resistant labyrinth seal comprised of an annular seal runner sealingly secured to said first and second rotor stages and a seal shroud surrounding an secured to said vanes stator assembly in closely spaced relationship to said seal runner, forming a labyrinth flow passage therebetween;
   an upstream plenum in restricted fluid communication with said annular flow upstream of said vaned stator assembly and with said labyrinth flow passage;
   a downstream plenum in fluid communication with said labyrinth flow passage and in restricted flow communication with said annular flow downstream of said vaned stator assembly;

a compressor;

a conduit network connected to deliver a cooling airflow from said compressor to said upstream plenum, and a modulatable control valve means located in said conduit network, the method of operation comprising:

measuring the temperature of gas passing through said labyrinth flow passage;

sensing a low engine power condition at a time when a subsequent power excursion is expected;

holding said valves open at said low power condition, independent of the sensed temperature; and after said power excursion has started, modulating the quantity of said cooling airflow in response to the measurement of the temperature of said gas passing through said labyrinth flow passage to keep the temperature at a substantially constant maximum value.

9. The method of claim 8 including at low engine power: confirming a valve open condition;

comparing the sensed temperature to an expected temperature range based on engine speed and ambient temperature;

sensing a fault message if said sensed temperature is higher than said temperature range.

10. The method of claim 9 including:

holding said valves open for the remainder of any flight if said sensed temperature is lower than said temperature range, and recording a message for later maintenance review.

* * * * *